United States Patent
Arnold et al.

(10) Patent No.: US 7,882,385 B2
(45) Date of Patent: Feb. 1, 2011

(54) REDUCING INEFFICIENCIES OF MULTI-CLOCK-DOMAIN INTERFACES USING A MODIFIED LATCH BANK

(75) Inventors: Nicole Marie Arnold, Cary, NC (US); Matthew Wayne Baker, Holly Springs, NC (US); Benjamin John Bowers, Cary, NC (US); Anthony Correale, Jr., Raleigh, NC (US); Paul Michael Steinmetz, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/950,620

(22) Filed: Dec. 5, 2007

(65) Prior Publication Data

US 2009/0150709 A1    Jun. 11, 2009

(51) Int. Cl.
 *G06F 1/04* (2006.01)
(52) U.S. Cl. .................. 713/600; 327/202; 327/203
(58) Field of Classification Search .......... 327/202, 327/203, 211; 713/600
 See application file for complete search history.

(56) References Cited

U.S. PATENT DOCUMENTS

| 5,115,455 | A | 5/1992 | Samaras et al. | 375/106 |
|---|---|---|---|---|
| 5,487,092 | A | 1/1996 | Finney et al. | 375/354 |
| 5,909,563 | A | 6/1999 | Jacobs | 395/309 |
| 6,000,022 | A | 12/1999 | Manning | 711/167 |
| 6,452,433 | B1 * | 9/2002 | Chang et al. | 327/202 |
| 6,489,825 | B1 * | 12/2002 | Pasqualini | 327/211 |
| 6,915,399 | B1 | 7/2005 | McDonnell et al. | 711/167 |
| 7,752,513 | B2 * | 7/2010 | Namura et al. | 714/726 |
| 2005/0204233 | A1 | 9/2005 | Shin et al. | 714/733 |

* cited by examiner

*Primary Examiner*—Albert Wang
(74) *Attorney, Agent, or Firm*—Winstead, P.C.

(57) ABSTRACT

A system and method for improving the performance and efficiency of multi-clock-domain data transmission interfaces. The data transmission interface may include a modified slave latch which includes one or more clock splitters and one or more transmission gates may be used. By having such a configuration, space requirements are reduced and a reduction of the number of devices necessary for a multi-domain interface may be realized. The configuration may further allow for independent cycle stealing of N:1 and N:2 logical paths, thus allowing for timing resolution solutions that use fewer devices versus implementations that require the tuning of each individual bit in the cross-clock-domain interface. By implementing such a data transmission interface, space and power requirements may be reduced and timing criticalities may be more easily managed.

20 Claims, 9 Drawing Sheets

US 7,882,385 B2

REDUCING INEFFICIENCIES OF MULTI-CLOCK-DOMAIN INTERFACES USING A MODIFIED LATCH BANK

TECHNICAL FIELD

The present invention relates to electronic data transmission, and more particularly to improving the performance and efficiency of multi-clock-domain data transmission interfaces by implementing an interface configuration including clock splitters and a modified latch bank.

BACKGROUND INFORMATION

Many electronic systems and applications require the transmission of data between clock domains of varying frequencies. When a logical path crosses from one clock domain to another, the designer of a circuit or system takes into account the timing requirements for all valid clock ratios between the relevant clock domains. The clock ratio between any two domains is typically defined as N:M, where N is the faster clock frequency and M is the slower clock frequency. The clock ratio between two clock domains determines the amount of delay allowed in a logical path that crosses between those clock domains.

Logical implementations of cross-domain interfaces that satisfy multiple clock ratios generally transmit at least some of the data directly from a source domain into a destination domain at the slower clock ratio. In some previous systems, a multiplexer is used to mux the directly transmitted data with other data that is from the source domain through a less direct logical path. A block diagram of an exemplary system having such a configuration is provided in FIG. 1, which is described in detail below.

Referring to FIG. 1, FIG. 1 is a block diagram of an exemplary system 100 for transmitting data between different clock domains including a bypass multiplexer. FIG. 1 shows, for purposes of example, an embodiment suitable for transmitting data from a faster clock domain to a slower clock domain.

As illustrated in FIG. 1, data that is to be transmitted from the faster clock domain to the slower clock domain is transmitted into master latch 101, then shifted into slave latch 102. Latches 101 and 102 reside in the faster clock domain. The data being transmitted as output from slave latch 102 may be separated according to the clock ratio of its logical path. In some systems, data having an N:1 ratio (N:1 transmit data 112) is transmitted directly into multiplexer 105.

In some systems, data having a clock ratio of N:2 (N:2 transmit data 111) is transmitted first into master latch 103, then transmitted into slave latch 104. N:2 transmit data 115 is then supplied from slave latch 104 to multiplexer 105.

Multiplexer 105 selects between N:1 transmit data 112 and N:2 transmit data 115. The selection of multiplexer 105 is controlled by a multiplexer select signal 118. The transmit data 116 output from multiplexer 105 is supplied to downstream logic 107.

In some systems, data is transmitted from downstream logic section 107 into a third latch bank, comprising master latch 108 and slave latch 109, both of which reside in the slower clock domain.

In data transfer interfaces, the clock ratio of a logical path is used to determine whether data traveling that path will be transmitted directly into the destination domain (e.g., the path of N:2 transmit data 111 in FIG. 1) or whether it first travels through the bypass multiplexer (e.g., the path of N:1 transmit data 112 in FIG. 1).

In many electronic circuits, including those that use latches, setup and hold times must be taken into account when designing the circuit to prevent or decrease the likelihood of circuit failure. The presence of jitter and skew in a circuit cause a reference signal to be indeterminate for a period of time before and after a scheduled state change. "Setup" time refers to the minimum amount of time that must exist between a reference signal changing state and a capture event to ensure that the reference signal is accurately captured. "Hold" time refers to the minimum amount of time that a reference signal must be held at its new state after a state change in order to ensure that the new stat is accurately captured.

Generally, for those paths for which the faster clock frequency is an integer multiple of the slower clock frequency (thus an N:1 ratio), the logical path between the clock domains has a full fast clock cycle to satisfy setup requirements. FIG. 2 is an exemplary timing diagram showing the allowable delay time for a multi-domain clock interface in a 2:1 clock ratio mode.

Referring to FIG. 2, the frequency of slow clock signal 202 is half of the frequency of fast clock signal 201, yielding a 2:1 clock ratio.

Arrow 203 shows the width of one full cycle of the fast clock signal.

In the case that slow clock signal 202 is a reference signal and the rising edge of fast clock signal 201 is a capture event, arrow 204 shows the delay between the reference clock launch and the capture event for an N:1 clock ratio. As shown by arrow 204 in FIG. 2, a full cycle of fast clock signal 201 exists between the launch of the reference signal and the capture event. The same is true in the case that fast clock signal 201 is a reference signal and the rising edge of slow clock signal 202 is a capture event, as shown by arrow 205.

For a logical path having a 2:1 clock ratio, the logical path has a full cycle of fast clock signal 201 in which to satisfy setup requirements. Thus, a 2:1 clock ratio allows for the maximum amount of delay possible for resolving timing criticalities.

In the examples described herein, an N:1 clock ratio is assumed for purposes of example to be the ratio in the interface that allows for the most delay. However, some embodiments may not contain any logical paths having an N:1 ratio. The data in an interface that allows for the largest amount of delay may follow the paths described in the examples as the N:1 paths. The present disclosure is applicable regardless of the specific clock ratios present in a particular interface.

Referring again to FIG. 1, because an N:1 path allows for the greatest amount of delay in the logical path, the N:1 path generally will use the path through the bypass multiplexer 105 (FIG. 1). For other clock ratios, the logical path will have a fraction of the fast clock cycle to satisfy setup requirements. See, e.g., description of FIG. 3 below. Logical paths having clock ratios other than N:1 generally use the more direct path to the destination domain.

FIG. 3 is an exemplary timing diagram showing the allowable delay time for a multi-domain clock interface in 3:2 clock ratio mode.

In FIG. 3, the frequency of slow clock signal 302 is two-thirds of the frequency of fast clock signal 302, yielding a 3:2 clock ratio.

Arrow 303 shows the width of one full cycle of the fast clock signal.

In the case that slow clock signal 302 is a reference signal and the rising edge of fast clock signal 301 is a capture event, arrows 304 and 306 show two different possible delay times. In the first instance, represented by arrow 304, a delay equal to one full cycle of fast clock signal 301 is available to satisfy setup requirements between the first slow clock signal 302 launch and the fast clock signal 301 rising edge capture event. However, during the second cycle of slow clock signal 302, a delay of only one-half of a cycle of fast clock signal 301 is available between the first slow clock signal 302 launch and the fast clock signal 301 rising edge capture event. This scenario is represented by arrow 306.

Arrow 305 represents a delay of one-half of a cycle of fast clock signal 301 between a launch of fast clock signal 301 and the next rising edge of slow clock signal 302.

For a logical path having a 3:2 clock ratio, the logical path may have only a fraction of a cycle of fast clock signal 301 in which to satisfy setup requirements. Thus, a 3:2 clock ratio allows for the significantly less delay for resolving timing criticalities, making a logical path having a 3:2 clock ratio significantly more time-critical.

In the examples described herein, an N:2 clock ratio is assumed for purposes of example to be the ratio in the interface that allows for the least delay. However, some embodiments may not contain any logical paths having an N:2 ratio. The data in an interface that allows for the least amount of delay may follow the paths described in the examples as the N:2 paths. The present disclosure is applicable regardless of the specific clock ratios present in a particular interface.

The multiplexer implementation of previous systems, such as the one of FIG. 1, causes significant difficulties with resolving timing violations. For example, in such an implementation as FIG. 1, clock skew and jitter reduce the amount of delay allowed in a logical path. FIG. 4 shows an example of how clock skew and jitter can reduce the delay available to satisfy setup requirements in an N:1 or N:2 logical path.

Referring to FIG. 4, FIG. 4 is an exemplary timing diagram showing the timing implications of clock skew and jitter for data transmission from a faster clock domain to a slower clock domain. The same principles hold true for transmissions of data from a slower clock domain to a faster clock domain.

The effects of clock skew are shown with relation to fast clock signal 401 and slow clock signal 402. Clock skew and jitter reduce the amount of delay allowed in both the N:1 and N:2 paths. In the example of FIG. 4, the clock ratio between fast clock signal 401 and slow clock signal 402 is 3:2.

Arrow 403 shows the width of a full theoretical cycle of fast clock signal 401. Arrow 404 shows the width of a cycle of fast clock signal 401 minus the jitter time of that signal. Arrow 405 shows the width of a cycle of fast clock signal 401 plus the jitter time of that signal. The space between the right edge of arrow 404 and the right edge of arrow 405, then, represents the time during which the state of fast clock signal 401 is indeterminate. Similarly, reference 406 shows the times during which slow clock signal 402 may be indeterminate due to skew.

Arrow 407 shows a potential hold problem that is caused by the indeterminate arrival times of the fast clock signal 401 launch and slow clock signal 402 rising edge capture.

Arrows 408 and 409 show setup delays at two different cycles of slow clock signal 402. Note again that for clock ratios other than N:1, delay times for satisfying setup and hold requirements may vary because of odd clock ratios. In this instance, there is much more delay time available in the downstream clock cycle (arrow 409), as contrasted with one cycle of slow clock signal 402 earlier (arrow 408).

Some embodiments of the present invention, described in detail below, allow for greater flexibility in resolving the timing criticalities explained above, including criticalities related to clock skew and jitter.

In the case of logical paths that cross clock domains, the presence of skew and jitter may result in timing criticalities in any logical path, regardless of clock ratio. This is true whether data is being transmitted from a slower clock domain to a faster clock domain or from a faster clock domain to a slower clock domain.

Another limitation of the multiplexer implementation of FIG. 1 is that the multiplexer delay slows down the worst-case timing for the data path through the multiplexer 105. As a result, a circuit designer makes adjustments to ensure that the setup requirements are satisfied. Such adjustments commonly involve the usage of low voltage threshold (low-vt) devices or cycle stealing. Cycle stealing is a method by which a clock signal period may be manipulated to resolve timing criticalities at selective signal launch and capture points in a system. For example, if the delay of a particular logical path is longer than the period of its capture clock signal, the arrival time of the clock signal to the downstream latch may be delayed to effectively lengthen the path to the latch. Such a solution also results in the logical path on the other side of a cycle-stolen latch having an allowable delay that is less than the clock period by the amount of the cycle-steal delay, which in some systems may cause another potential timing criticality and require further measures to stabilize the system. Conversely, rather than delaying the capture latch, the clock arrival time of the launching latch could be accelerated to prevent a potential timing failure.

Solving timing criticalities entirely with low-vt devices would require using a low-vt device in each multiplexer bypass path, which would result in a substantial increase in leakage power for most multi-bit interfaces. Therefore, cycle stealing has commonly been preferred as a more power-efficient solution. However, as data transmissions have increased and circuits have become more complex, cycle stealing alone has often not been able to resolve all timing criticalities. The tight timing characteristics of many modern systems have required both low-vt devices and cycle stealing to be implemented, often resulting in relatively low maximum worst case frequencies for logical paths.

Additionally, configurations that require a full bypass multiplexer for each bit of a cross-domain interface have large area and power requirements. For example, in the system of FIG. 1, at least one multiplexer is required for each bit of data to be transmitted. Even for the simplest interface, the requirement can add up to hundreds or thousands of multiplexers.

Hence, if the number of devices, such as multiplexers, required to be used in data transmissions between clock domains of varying frequencies could be reduced or replaced in such a manner as to reduce the required area, then power requirements may be reduced. Further, a solution that replaces multiplexers with other components (e.g. clock splitters), may allow for more flexibility in resolving timing criticalities. The reduction of required area and power and allowance for more flexibility in resolving timing violations may further yield an increase in the worst-case frequency of data transmissions.

Therefore, there is a need in the art for improvements in the performance and efficiency of multi-clock-domain data transmission interfaces.

SUMMARY

The space and performance inefficiencies of previous systems may be partially eliminated by implementing a configuration that utilizes a modified latch bank with clock splitters and transmission gates in place of the latch bank and separate multiplexer of previous systems. Such a configuration may also yield greater flexibility for resolving timing criticalities at the data transmission interface.

The configuration disclosed reduces the number of devices necessary when compared to the implementation utilizing a latch bank and separate multiplexer. Further, as described in detail below, its structure allows for independent cycle stealing of the N:1 and N:2 logical paths, thus allowing for timing resolution solutions that use significantly fewer devices versus implementations that require the tuning of each individual bit in the cross-clock-domain interface. Therefore, the power and area savings of the disclosed embodiments may extend beyond those devices in the modified slave latch itself because timing criticalities that would otherwise have been resolved in the downstream logic may instead be resolved within the multi-domain interface itself.

In one embodiment of the present invention, a system comprises a master data latch for receiving and outputting first transmit data. The system further comprises a first clock splitter for supplying a first clock signal to the master data latch and for supplying a second clock signal to a first transmission gate. Additionally, the system comprises a second clock splitter for supplying a third clock signal to a second transmission gate. Further, the system comprises a transmission node coupled to the output of the first transmission gate and the output of the second transmission gate, where the first transmission gate receives first transmit data from the output of the master data latch, the second transmission gate receives second transmit data, and the second clock signal and third clock signal are logically mutually exclusive.

In some embodiments, data is supplied at the transmission node. In other embodiments, a first inverting logic gate having its input connected to the transmission node and its output connected to an output node is provided in conjunction with a second inverting logic gate having its input connected to the output node and its output connected to the transmission node. In some embodiments, output data is provided at the output node.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention may be obtained when the following detailed description is considered in conjunction with the following drawings, in which.

DETAILED DESCRIPTION

Figure 1:
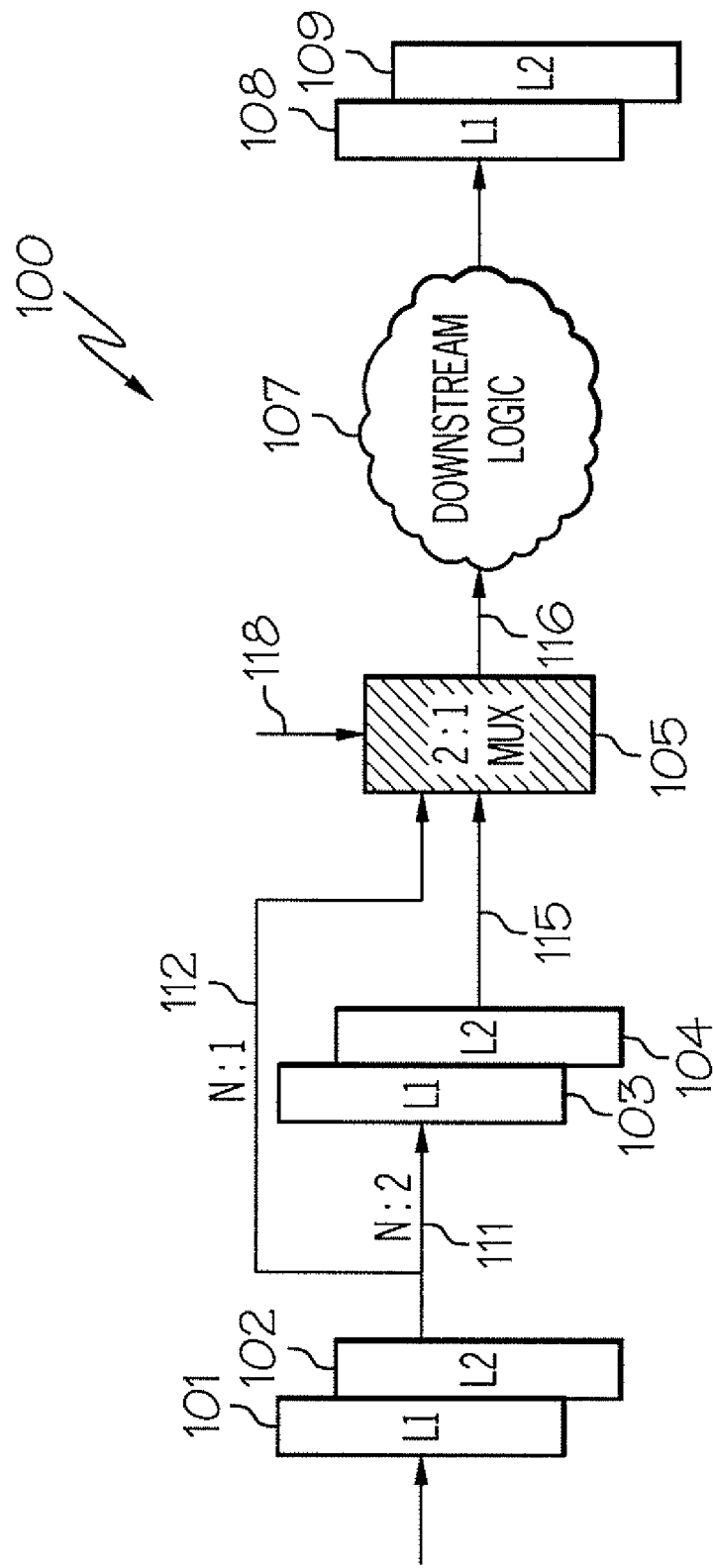
FIG. 1 is a diagram of an exemplary system for transmitting data between different clock domains including a bypass multiplexer.
Figure 2:
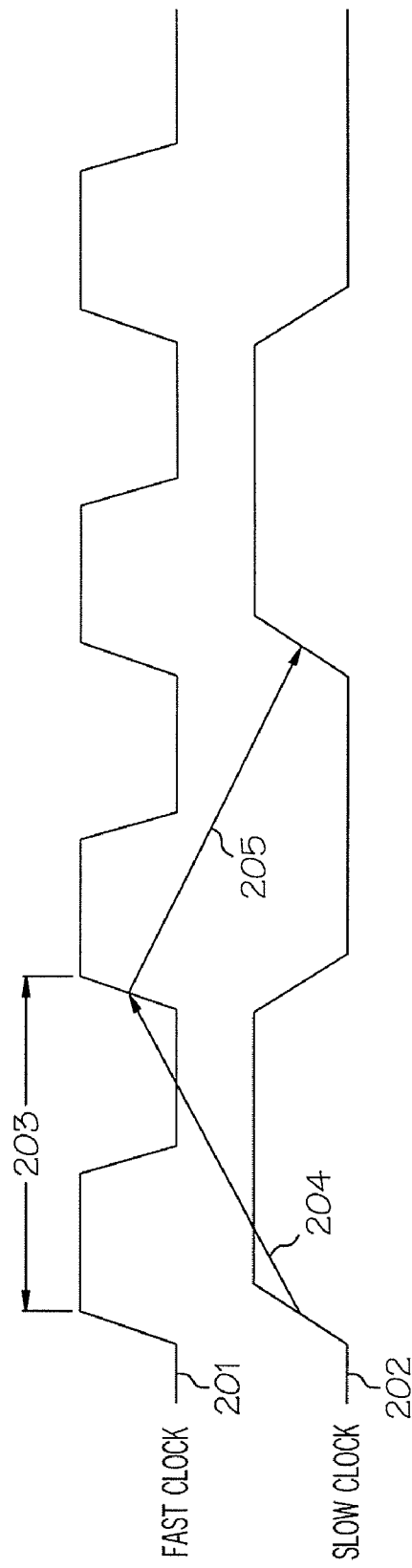
FIG. 2 is an exemplary timing diagram showing the allowable delay time for a multi-domain clock interface in 2:1 clock ratio mode.
Figure 3:
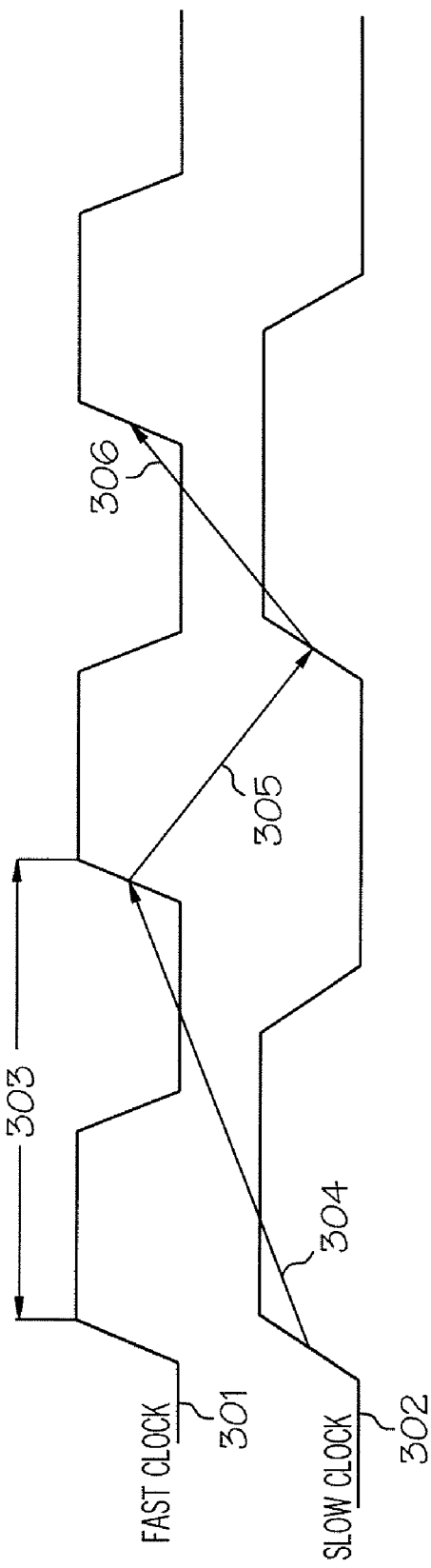
FIG. 3 is an exemplary timing diagram showing the allowable delay time for a multi-domain clock interface in 3:2 clock ratio mode.
Figure 4:
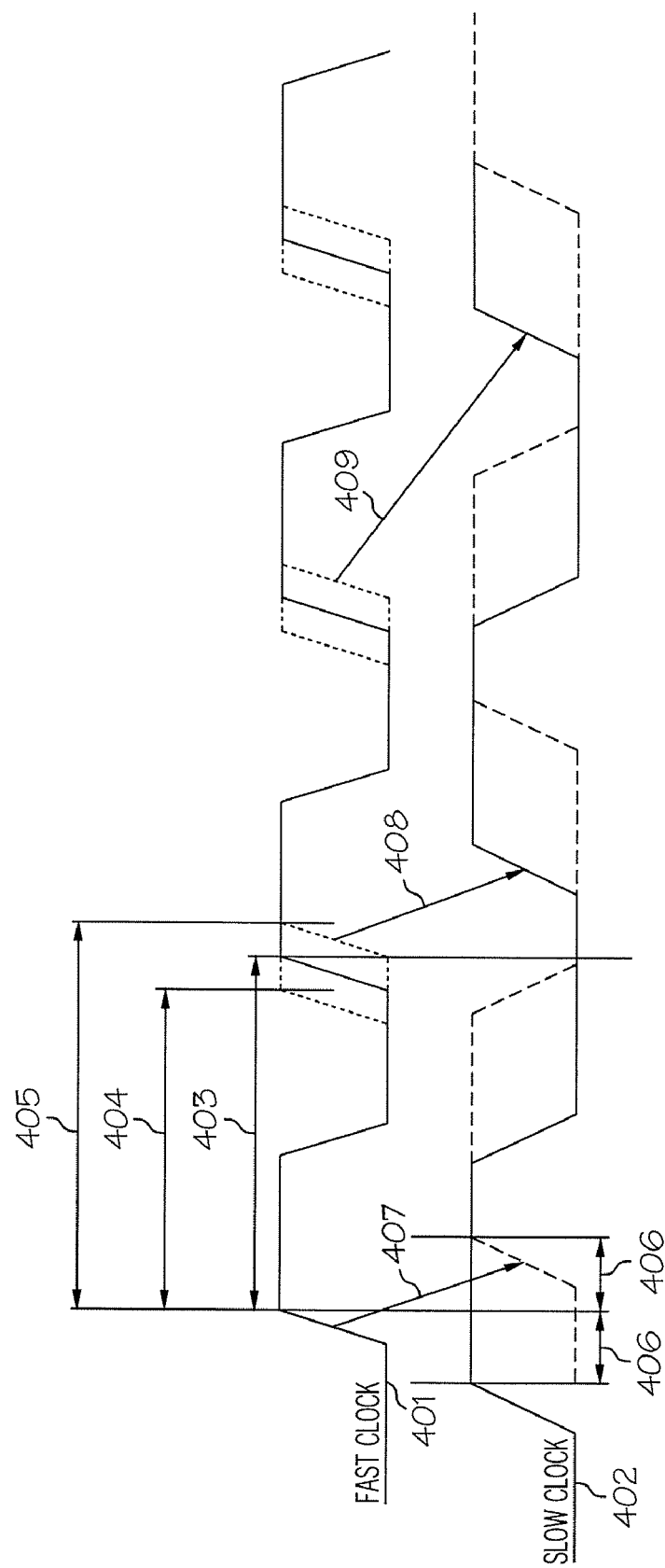
FIG. 4 is an exemplary timing diagram showing the timing implications of clock skew and jitter for data transmission from a faster clock domain to a slower clock domain.

The present invention comprises a system and method for transmitting data between clock domains. In one embodiment of the present invention, the latch-and-multiplexer implementation of a cross-domain interface used in previous systems is integrated to save area and power and to improve mixed clock domain performance and efficiency. Further, some embodiments of the present invention allow for greater flexibility in resolving timing criticalities than do previous systems. The embodiments described in detail below contemplate synchronous clock domains. However, the system and method disclosed are applicable to any multi-clock-domain interface.

When a logical path crosses from one clock domain to another, the designer of a circuit or system takes into account the timing requirements for all valid clock ratios between the relevant clock domains. A domain may be any electronic domain that utilizes a digital clock. For example, in some embodiments, a domain may be a CPU interface, a local bus, a memory cache, or a hard disk. The clock ratio between any two domains is typically defined as N:M, where N is the faster clock frequency and M is the slower clock frequency. The clock ratio between two clock domains determines the amount of delay allowed in a logical path that crosses between those clock domains.

The clock ratio of a logical path may be used to determine whether data traveling that path will be transmitted directly into the destination domain or whether it first travels through the bypass multiplexer. Generally, those paths where the faster clock frequency is an integer multiple of the slower clock frequency (thus an N:1 ratio), the logical path between the clock domains has a full fast clock cycle to satisfy setup requirements. For other clock ratios, the logical path will have a fraction of the fast clock cycle to satisfy setup requirements.

In one embodiment of the present invention, the logical path having a clock ratio that allows for the greatest amount of delay in the logical path will use the less direct (bypass) path to the destination domain. In the embodiments of the present invention described in detail below, it is assumed for purposes of example that the bypass logical path has an N:1 clock ratio. In one embodiment of the present invention, logical paths having clock ratios other than N:1 will use the more direct path to the destination domain. In the embodiments of the present invention described in detail below, it is assumed for purposes of example that the more direct logical path has an N:2 clock ratio.

In the examples described herein, an N:1 clock ratio is assumed for purposes of example to be the ratio in the interface that allows for the most delay. However, some embodiments may not contain any logical paths having an N:1 ratio. The data in an interface that allows for the largest amount of delay may follow the paths described in the examples as the N:1 paths. The present disclosure is applicable regardless of the specific clock ratios present in a particular interface.

In the examples described herein, an N:2 clock ratio is assumed for purposes of example to be the ratio in the interface that allows for the least delay. However, some embodiments may not contain any logical paths having an N:2 ratio. The data in an interface that allows for the least amount of delay may follow the paths described in the examples as the N:2 paths. The present disclosure is applicable regardless of the specific clock ratios present in a particular interface.

While the N:1 and N:2 ratios are used as examples for the detailed description of embodiments in this disclosure, it is to be understood that the invention system and method disclosed are applicable to any set of clock domain ratios.

Figure 5:
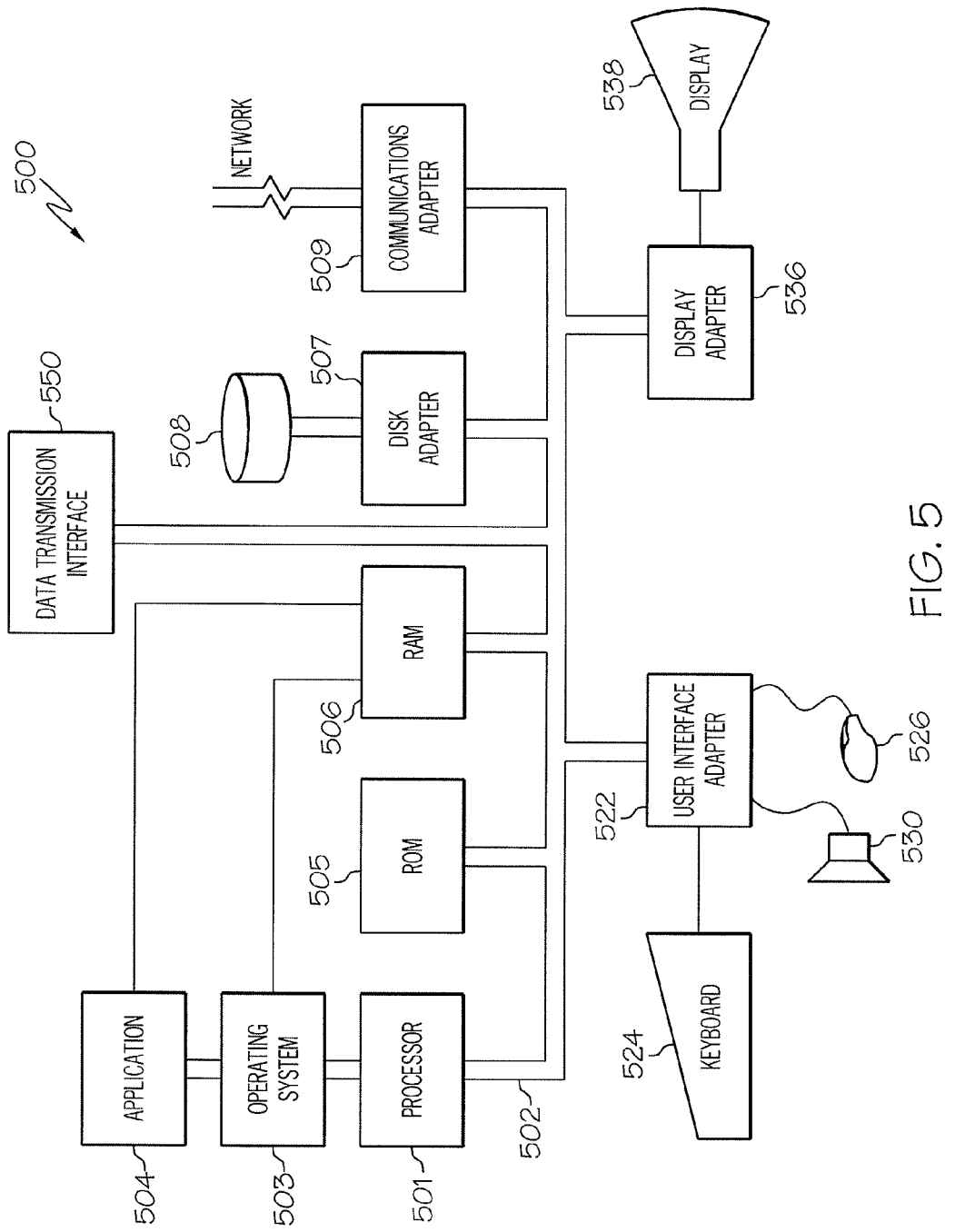
FIG. 5 illustrates an embodiment of a hardware configuration of an exemplary computer system including a data transmission interface in accordance with an embodiment of the present invention.

FIG. 5—Computer System

FIG. 5 illustrates an embodiment of a hardware configuration of a computer system 500, which is representative of a hardware environment for practicing the present invention. Computer system 500 may have a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504.

Referring to FIG. 5, Read-Only Memory (ROM) 505 may be coupled to system bus 502 and include a basic input/output system ("BIOS") that controls certain basic functions of computer system 500. Random access memory (RAM) 506 and disk adapter 507 may also be coupled to system bus 502. It should be noted that software components including operating system 503 and application 504 may be loaded into RAM 506, which may be computer system's 500 main memory for execution. Disk adapter 507 may be an integrated drive electronics ("IDE") adapter that communicates with a disk unit 508, e.g., disk drive.

Referring to FIG. 5, computer system 500 may further include a data transmission interface unit 550 for facilitating data transmissions between various components of computer system 500. Data transmission interface 550 may be coupled to other components of computer system 500 by bus 502 or by other means. In some embodiments, data transmission interface unit 550 may be implemented completely as a stand-alone unit. In other embodiments, data transmission interface 550 may be implemented as part of the circuitry of the components between which data is to be transmitted. For example, if data is to be transmitted between processor 501 and disk adapter 507, data transmission interface unit may be implemented as part of the circuitry of processor 501, as part of disk adapter 507, or partially in both.

In some embodiments, computer system 500 may include a single data transmission interface 550 for handling a plurality of different types of data transmissions between all components of computer system 500. In other embodiments, computer system 500 may comprise a plurality of data transmission interfaces 550, each of which handles some of the data transmissions necessary to operate computer system 500. In still other embodiments, computer system 500 may include a plurality of data transmission interfaces 500, each of which is configured to handle only a single type of data transmission. Data transmission interface 550 may be configured to handle data transmissions between components in the same clock domain, between components in different clock domains, or both. An exemplary configuration of a data transmission 550 is described in further detail below with reference to FIG. 6.

Referring to FIG. 5, computer system 500 may further include a communications adapter 509 coupled to bus 502. Communications adapter 509 may interconnect bus 502 with an outside network (not shown) enabling computer system 500 to communicate with other such devices.

I/O devices may also be connected to computer system 500 via a user interface adapter 522 and a display adapter 536. Keyboard 524, mouse 526 and speaker 530 may all be interconnected to bus 502 through user interface adapter 522. Data may be inputted to computer system 500 through any of these devices. A display monitor 538 may be connected to system bus 502 by display adapter 536. In this manner, a user is capable of inputting to computer system 500 through keyboard 524 or mouse 526 and receiving output from computer system 500 via display 538 or speaker 530.

Figure 6:
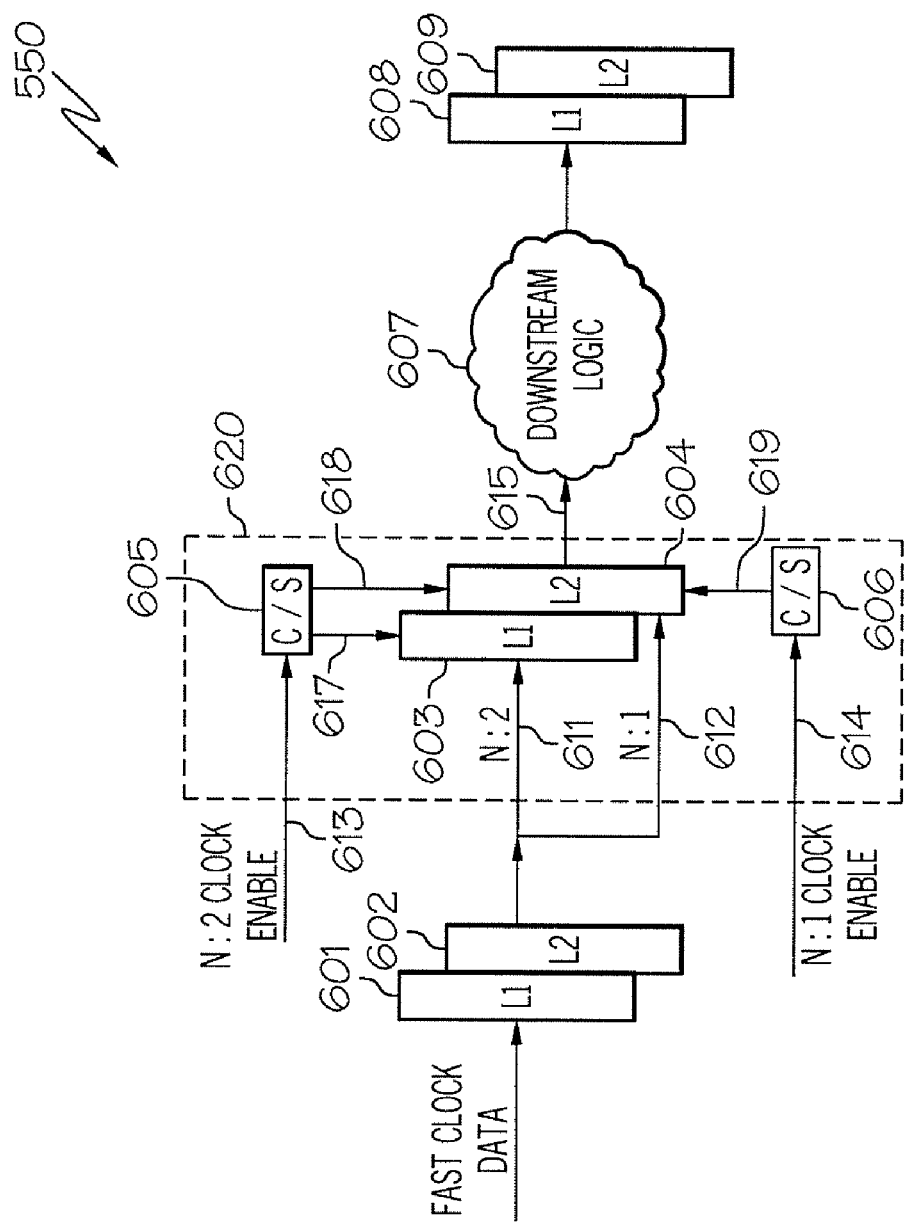
FIG. 6 is a diagram of an exemplary multi-domain data transmission interface according to an embodiment of the present invention, configured for transmission of data from a faster clock domain to a slower clock domain in accordance with an embodiment of the present invention.

FIG. 6—Cross-clock-domain Data Interface Utilizing Modified Latch

FIG. 6 is a diagram showing the components of an exemplary configuration of data transmission interface 550. In an embodiment of the present invention, data transmission interface 550 is a cross-clock-domain data interface configuration that utilizes a modified slave latch and two clock splitters.

A clock domain may be any circuitry having a clock at a particular frequency. A clock domain may comprise, for example, one of a CPU, a ROM, a RAM, a communications adapter, a magnetic storage device, a display adaptor, or a user interface adapter. FIG. 6 shows, for purposes of example, an embodiment suitable for transmitting data from a faster clock domain to a slower clock domain, however, the configuration disclosed is also suitable for handling transmissions of data from a slower clock domain to a faster clock domain.

Referring to FIG. 6, data that is to be transmitted from the faster clock domain to the slower clock domain is transmitted into master latch 601, then shifted into slave latch 602. Latches 601 and 602 reside in the faster clock domain. The data to be transmitted may be any number of bits, according to the requirements of the specific system in which the cross-clock-domain interface is to be implemented. In some embodiments of the present invention, latches 601 and 602 may function together as a level-sensitive scan design (LSSD) type latch back. The LSSD architecture and its various configurations are well-known in the art and will not be further described here.

The data being transmitted as output from slave latch 602 may be separated according to the clock ratio of its logical path. In some embodiments of the present invention, data having an N:1 ratio (N:1 transmit data 612) is transmitted directly into modified slave latch 604. In other embodiments, the data transmitted on this path may not have exactly an N:1 ratio. The data in the data transmission interface that has the least timing-critical clock ratio will be transmitted on the path marked N:1 on exemplary FIGS. 6 and 7.

Referring again to FIG. 6, data having a clock ratio of N:2 (N:2 transmit data 611) is transmitted first into master latch 603, then transmitted into modified slave latch 604. In other embodiments, the data transmitted on this path may not have exactly an N:2 ratio. The data in the data transmission interface that has the more timing-critical clock ratio will be transmitted on the path marked N:2 on exemplary FIGS. 6 and 7.

Modified slave latch 604 comprises architecture that varies from the standard slave latch implementation of an LSSD latch bank, while preserving full LSSD operation. Modified slave latch 604 is described in further detail below with reference to FIG. 7.

Referring again to FIG. 6, an N:2 clock enable signal 613 is supplied to clock splitter 605. Clock splitter 605 supplies C1 clock signal 617 to drive master latch 603. Clock splitter 605 also supplies C2 clock signal 618 to modified slave latch 604.

An N:1 clock enable signal 614 is supplied to clock splitter 606. Clock splitter 606 supplies C3 clock signal 619 to modified slave latch 604. As discussed below in further detail, C3 clock signal 619 is of the same phase as C2 clock signal 618, but clock signals 618 and 619 are logically exclusive. Further, in some embodiments, N:1 clock enable signal 614 may be controllable by test to allow for the enabling and disabling of C3 clock signal 619 as needed.

In some embodiments, data is transmitted from modified slave latch 604 to a downstream logic section 607. Downstream logic section 607 may contain circuitry for parsing, splitting, temporary or permanent storage, or other manipulation of the data. Downstream logic section 607 may also contain circuitry for resolving timing criticalities.

In some embodiments, data may be transmitted from downstream logic section 607 into a third latch bank, comprising master latch 608 and slave latch 609, both of which may reside in the slower clock domain. In some embodiments, latches 608 and 609 may be configured as a LSSD latch bank or in any other suitable configuration.

In some embodiments, modified latch bank 620 is coupled to at least slave latch 602 and downstream logic 607. Modified latch bank 620 comprises master latch 603, which may be a standard LSSD master latch implementation. Modified latch bank 620 further comprises clock splitters 605 and 606. Modified latch bank 620 further comprises modified slave latch 604, the configuration of which is described in detail below with reference to FIG. 7.

While the exemplary embodiment of FIG. 6 shows an exemplary implementation of data transmission bus 550 implementation suitable for transmitting data from a faster clock domain to a slower clock domain, the present disclosure is also applicable for transmitting data from a slower clock domain to a faster clock domain.

Figure 7:
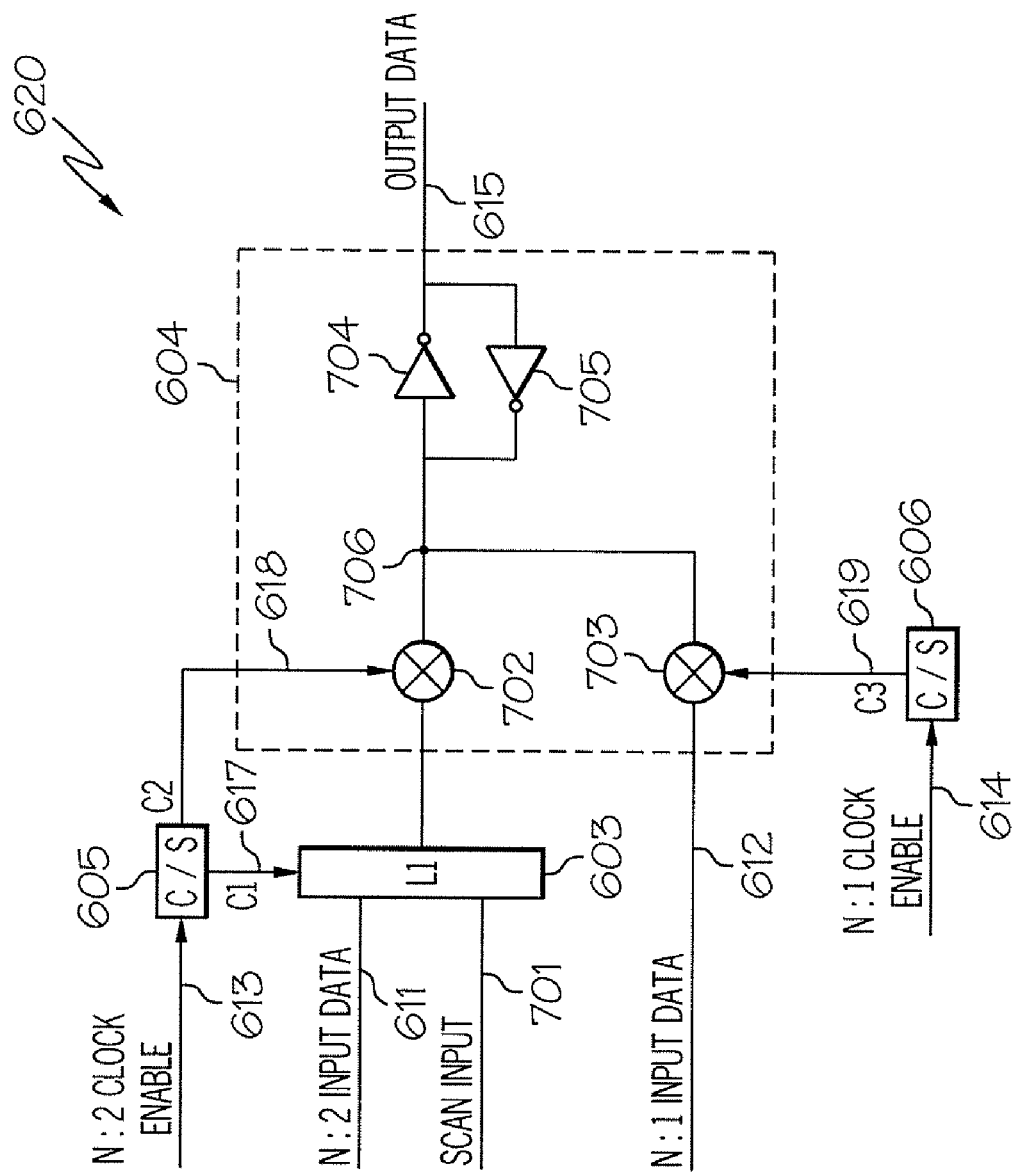
FIG. 7 is a schematic for a modified latch bank according to an embodiment of the present invention.

FIG. 7—Schematic of Latch Bank Including Modified Slave Latch

FIG. 7 is a schematic for a modified latch bank 620 according to an embodiment of the present invention.

Referring to FIG. 7, in conjunction with FIG. 6, the N:2 transmit data 611, scan input 701, and C1 clock signal 617 are supplied to master latch 603. Scan input 701 controls the timing of transmission of data from a master latch to a slave latch in a standard LSSD configuration. Scan input 701 is well known in the art and no further explanation will be provided here. Master latch 603 may be a master latch according to a LSSD configuration. In some embodiments, master latch 603 may further include one or more test inputs (not shown) to control various modes of master latch 603.

N:2 transmit data 611 is supplied to N:2 path transmission gate 702. N:2 path transmission gate 702 is driven by C2 clock signal 618. The output of N:2 path transmission gate 702 is connected to node 706 as shown in FIG. 7.

N:1 transmit data 612 is supplied to N:1 path transmission gate 703. N:1 path transmission gate 703 is driven by C3 clock signal 619. The output of N:1 path transmission gate 703 is connected to node 706 as shown in FIG. 7.

Because the outputs of transmission gates 702 and 703 supply the same node, the drive signals of those transmission gates (clock signals 618 and 619, respectively) are logically mutually exclusive. Further, clock splitter 606 is controllable by test so that C3 clock signal 619 may be disabled as needed. This allows for the N:1 data to be flushed through the modified slave latch or launched from an edge of the clock, depending on the relative criticalities of the downstream setup and hold paths.

In some embodiments, two inverting logic gates 704 and 705 are supplied in parallel to each other and also connected to node 706 as shown in FIG. 7.

Output data 615 is supplied to downstream logic section 607 (FIG. 6) beyond inverting logic gates 704 and 705.

As described above, in some embodiments, the N:2 clock enable signal 613 is split and used both for driving master latch 603 and for driving N:2 path transmission gate 702, thus reducing the delay and consequently reducing the setup criticality of some logical paths.

In some embodiments, the transmission time of N:1 transmit data 612 may be controlled through the use of cycle stealing. In particular, the arrival time of the N:1 path transmission gate's (703) control clock 619 may be stolen to allow N:1 data to either flush through the modified slave latch or be launched from an edge of the clock, depending on the relative criticalities of the downstream setup and hold paths. Such an implementation allows for further arrival time manipulation with a minimum of circuitry, since each bit of the cross-domain bus need not necessarily be adjusted individually. One result is a drastic reduction in power and area inefficiencies in the multi-domain interface.

In some embodiments, further flexibility in resolving timing criticalities is achieved because the output clock signals 618 and 619 for the N:2 and N:1 paths, respectively, are provided from separate clock splitters allowing the N:1 and N:2 logical paths to be cycle stolen independently. Further, controlling the N:1 path with an output clock signal 619 instead of a multiplexer select allows clock skew to be accounted for either at the modified slave latch or in downstream logic. It can be difficult to address downstream N:1 setup and hold paths with clock skew without affecting other single-clock-domain paths that are coupled to the same logic section. Therefore, in some implementations it may be easier to satisfy clock skew requirements on the N:1 path rather than downstream, since the N:1 logical path may connect to fewer other logical paths than the downstream logic.

A flowchart for a method of transmitting data between clock domains of varying frequencies in accordance with an embodiment of the present invention is described in detail and presented below in FIG. 8.

Figure 8:
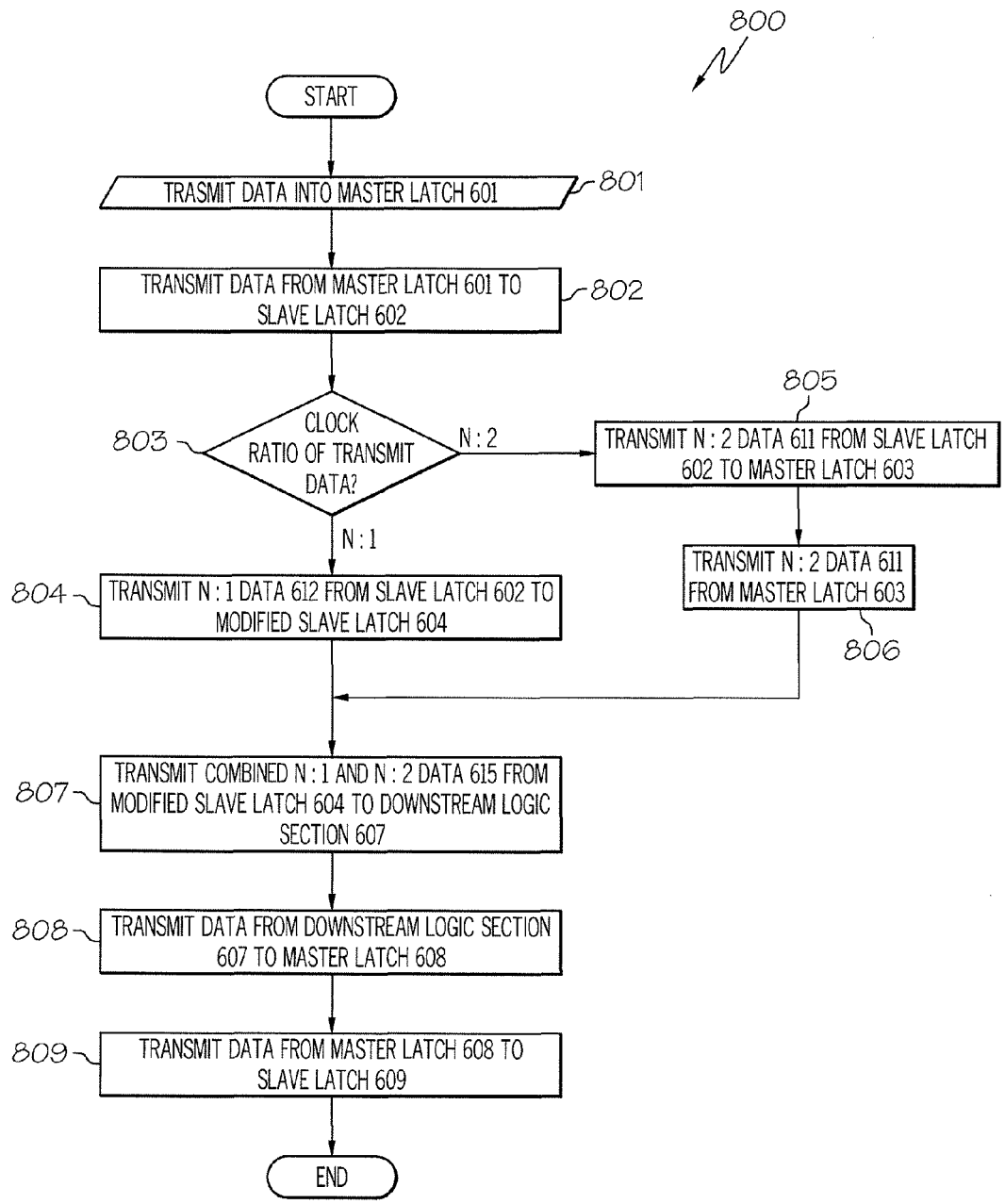
FIG. 8 is a flowchart of the exemplary method shown in FIG. 6 for transmitting data between different clock domains according to an embodiment of the present invention.

FIG. 8—Method for Transmitting Data Between Different Clock Domains

FIG. 8 is a flowchart of a method 800 for transmitting data between different clock domains in accordance with an embodiment of the present invention. In particular, this flowchart shows method 800 for transmitting data from a faster clock domain to a slower clock domain. However, method 800 disclosed is equally applicable to transmissions of data from a slower domain to a faster domain.

Referring to FIG. 8, in conjunction with FIGS. 6 and 7, at step 801 the data to be transmitted to the faster domain is transmitted into master latch 601.

At step 802, the data to be transmitted is scanned into slave latch 602. As discussed above, "scanning" refers to the transmission of data from a master latch to a slave latch in a standard LSSD implementation.

At step 803, a determination is made whether the clock ratio of the transmit data is N:1 or N:2. Data having a clock ratio allowing for the greatest delay (thus the least time-critical data) is here assumed to follow the N:1 path, regardless of whether or not the clock ratio of the least time-critical data is exactly N:1. Data having a clock ratio allowing for less delay is here assumed to follow the N:2 path, regardless of whether the ratio of such data is exactly N:2. As discussed above the ratios N:1 and N:2 are used in this disclosure for simplicity and are exemplary ratios only.

At step 804, N:1 data is transmitted from slave latch 602 in the faster clock domain directly into modified slave latch 604 in the slower clock domain.

Turning to the N:2 path, at step 805, N:2 data is transmitted from slave latch 602 in the faster clock domain into master latch 603 in the slower clock domain.

At step 806, N:2 data is scanned from master latch 603 into modified slave latch 604. The timing of the scan is controlled in part by C1 clock signal 617, supplied from clock splitter 605. Clock splitter 605 is supplied by N:2 clock enable signal 613.

At step 807, data is transmitted from modified slave latch 604 to downstream logic section 607. As discussed above, the timing and path of this data transmission is controlled by transmission gates 702 and 703, which control the N:2 and N:1 paths, respectively. N:2 path transmission gate 702 (N:2 path) is driven by C2 clock signal 618, supplied from clock splitter 605. N:1 path transmission gate 703 (N:1 path) is controlled by C3 clock signal 619, supplied from clock splitter 606. Clock splitter 606 is supplied by N:1 clock enable signal 614. As discussed in detail above, the outputs of transmission gates 702 and 703 are connected to the same node, and clock signals 618 and 619 are logically mutually exclusive.

In some embodiments, at step 808, data is then transmitted from downstream logic section 607 into master latch 608 in the slower clock domain.

In some embodiments, data may then be scanned from master latch 608 into slave latch 609 at step 809.

It is noted that method 800 may include other and/or additional steps that, for clarity, are not depicted. Further, method 800 may be executed in a different order presented and that the order presented in the discussion of FIG. 8 is illustrative. Additionally, certain steps in method 800 may be executed in a substantially simultaneous manner or may be omitted.

Figure 9:
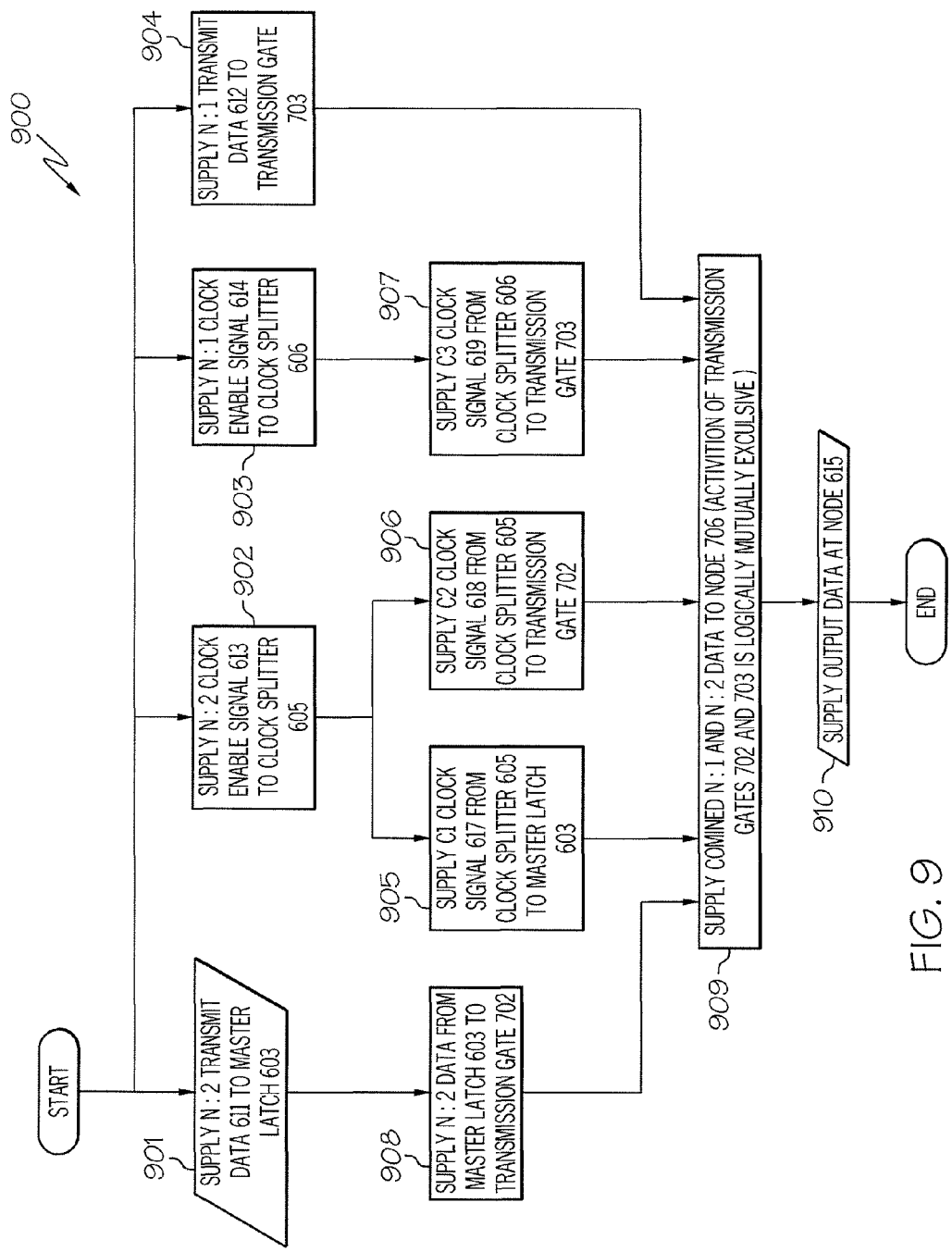
FIG. 9 is a flowchart of an exemplary method for configuring a modified latch bank for use in a system for transmitting data between different clock domains according to an embodiment of the present invention.

FIG. 9—Method for Configuring a Modified Latch Bank for Use in a Cross-clock-domain Data Transmission System FIG. 9 is a flowchart of an exemplary method 900 for configuring a modified latch bank for use in a system for transmitting data between different clock domains according to an embodiment of the present invention.

Referring to FIG. 9, in conjunction with FIGS. 6 and 7 and the related discussion above, the data to be transmitted is split according to clock ratio upon exiting the latch bank 601/602. Data having a clock ratio allowing for the greatest delay (thus the least time-critical data) is assumed to follow the N:1 path, regardless of whether or not the clock ratio of the least time-critical data is exactly N:1. Data having a clock ratio allowing for less delay is here assumed to follow the N:2 path, regardless of whether the ratio of such data is exactly N:2. As discussed above the ratios N:1 and N:2 are used in this disclosure for simplicity and are exemplary ratios only.

N:2 transmit data is supplied to master latch 603 at step 901.

At step 902, N:2 clock enable signal 613 is supplied to clock splitter 605. N:1 clock enable signal 614 is supplied to clock splitter 606 at step 903.

At step 904, N:1 transmit data is supplied to transmission gate 703.

At step 905, C1 clock signal 617 is supplied to master data latch 603 from clock splitter 605. Clock splitter 605 also supplies C2 clock signal 618 to transmission gate 702 at step 906.

At step 907, C3 clock signal 619 is supplied to transmission gate 703 from clock splitter 606.

N:2 transmit data is supplied to transmission gate 702 from master latch 603 at step 908.

At step 909, N:1 and N:2 transmit data is combined by supplying the output of transmission gate 702 and the output of transmission gate 703 both at node 706. Because the transmission gates output to the same node, C2 clock signal 618 and C3 clock signal 619 are logically mutually exclusive. In some embodiments of the present invention, output data is supplied at node 706.

In an alternative embodiment, the input of logical inverter 704 and the output of logical inverter 705 are connected to node 706. The output of logical inverter 704 and the input of logical inverter 705 are then connected together at output node 615. In an alternative embodiment, output data is supplied at output node 615 at step 910.

It is noted that method 900 may include other and/or additional steps that, for clarity, are not depicted. Further, method 900 may be executed in a different order presented and that the order presented in the discussion of FIG. 9 is illustrative. Additionally, certain steps in method 900 may be executed in a substantially simultaneous manner or may be omitted.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A data transmission interface comprising:
   a master data latch for receiving and outputting a first transmit data;
   a first clock splitter coupled to the master data latch, wherein the first clock splitter supplies a first clock signal to the master data latch;
   a first transmission gate coupled to the master data latch and the first clock splitter, wherein the first transmission gate receives a second clock signal from the first clock splitter and receives the first transmit data from an output of the master data latch;
   a second clock splitter;
   a second transmission gate coupled to the second clock splitter, wherein the second transmission gate receives a third clock signal from the second clock splitter; and
   a transmission node coupled to an output of the first transmission gate and an output of the second transmission gate.

2. The data transmission interface according to claim 1, wherein output data is supplied at the transmission node.

3. The data transmission interface according to claim 1, further comprising:
   a first inverting logic gate having its input coupled to the transmission node and its output connected to an output node; and
   a second inverting logic gate having its output coupled to the transmission node.

4. The data transmission interface according to claim 1, wherein the data transmission interface is configured to transmit data between a source clock domain and a destination clock domain.

5. The data transmission interface according to claim 4, wherein a clock frequency of the source clock domain is slower than a clock frequency of the destination clock domain.

6. The data transmission interface to claim 4, wherein a clock frequency of the source clock domain is faster than a clock frequency of the destination clock domain.

7. The data transmission interface according to claim 4, wherein the source or destination clock domain comprises one or more of the following:
   a central processing unit;
   a local bus;
   a memory cache;
   a magnetic storage device;
   a random-access memory (RAM);
   a communications adapter;
   a user interface adapter;
   a display adapter; and
   a read-only memory (ROM).

8. The data transmission interface according to claim 4, wherein a first latch bank supplies the first transmit data to the master data latch.

9. The data transmission interface according to claim 8, wherein the source clock domain comprises the first latch bank.

10. The data transmission interface of claim 1, further comprising a test input for disabling the third clock signal.

11. The data transmission interface of claim 1, further comprising a test input for disabling the second clock signal.

12. The data transmission interface according to claim 1, further comprising:
   a first clock enable signal supplied to the first clock splitter; and
   a second clock enable signal supplied to the second clock splitter.

13. The data transmission interface according to claim 1, wherein:
   the master data latch is configured according to a level-sensitive scan design (LSSD) master latch implementation; and
   the master data latch further receives a scan input.

14. The data transmission interface according to claim 1, wherein the master data latch further receives at least one test input.

15. The data transmission interface according to claim 1, wherein output data is supplied to a downstream logic section.

16. The data transmission interface according to claim 1, wherein:
   output data is supplied to a destination latch bank; and
   the destination clock domain comprises the destination latch bank.

17. A method of transmitting data between a source clock domain and a destination clock domain, the method comprising:
   supplying a first transmit data to a master data latch;
   supplying a first clock enable signal to a first clock splitter;
   supplying a second clock enable signal to a second clock splitter;
   supplying a first clock signal to the master data latch from the first clock splitter;
   supplying a second clock signal to a first transmission gate from the first clock splitter;
   supplying a third clock signal to a second transmission gate from the second clock splitter; and
   supplying a second transmit data to the second transmission gate;
   wherein:
      the second clock signal and third clock signal are logically mutually exclusive; and
      the output of the first transmission gate and the output of a second transmission gate are connected to a transmission node.

18. The method according to claim 17, the method further comprising supplying output data at the transmission node.

19. The method according to claim 17, the method further comprising:
   connecting an input of a first inverting logic gate and an output of a second inverting logic gate to the transmission node;
   connecting an output of the first inverting logic gate and an input of the second inverting logic gate to an output node; and
   supplying output data at the output node.

20. The method according to claim 17, the method further comprising supplying a test signal to the second clock splitter to disable the third clock signal when desired.

* * * * *